United States Patent [19]

Irvin

[11] Patent Number: 4,628,156
[45] Date of Patent: Dec. 9, 1986

[54] CANCELLER TRAINED ECHO SUPPRESSOR

[75] Inventor: David R. Irvin, Raleigh, N.C.

[73] Assignee: International Business Machines Corporation, Armonk, N.Y.

[21] Appl. No.: 453,322

[22] Filed: Dec. 27, 1982

[51] Int. Cl.$^4$ .................................................. H04B 3/20
[52] U.S. Cl. ...................................... 379/410; 379/345
[58] Field of Search ............... 179/170.2, 170.6, 170.8; 370/32

[56] References Cited

U.S. PATENT DOCUMENTS

| | | | |
|---|---|---|---|
| 3,754,105 | 8/1973 | Poschenrieder et al. ........ | 179/170.2 |
| 3,787,645 | 1/1974 | Ochiai et al. .................... | 179/170.2 |
| 3,828,147 | 8/1974 | Ochiai et al. .................... | 179/170.2 |
| 4,005,277 | 1/1977 | Araseki et al. ................... | 179/170.2 |
| 4,029,912 | 6/1977 | Geigel et al. .................... | 179/170.2 |
| 4,051,332 | 9/1977 | Izumi et al. ...................... | 179/170.2 |
| 4,117,277 | 9/1978 | van den Elzen et al. ....... | 179/170.6 |
| 4,131,767 | 12/1978 | Weinstein ........................ | 179/170.2 |
| 4,225,754 | 9/1980 | Bernard et al. .................. | 179/81 B |

FOREIGN PATENT DOCUMENTS

2408249  6/1979  France .

OTHER PUBLICATIONS

1976 International Conf. on Comm., Vo. 3, Jun. 14–16, 1976, Philadelphia, Pa., pp. 36-9–36-12.

Primary Examiner—Thomas W. Brown
Assistant Examiner—R. Vaas
Attorney, Agent, or Firm—Edward H. Duffield

[57] ABSTRACT

An improved echo suppressor is described in which a more sophisticated echo canceller can be employed to derive optimum training coefficients for application to the echo suppressor. The canceller can be used on a shared basis among a large group of echo suppressors to provide periodic updating and adaptive training coefficients to each suppressor individually. The echo canceller operates in a supervisory role and is shared over a group of adaptive echo suppressors. The canceller trains each adaptive echo suppressor during a set up period for newly initiated voice traffic. The canceller is also responsible for initializing the parameters of a multi-parameter echo suppressor where the parameters are generated as a result of the coding technique employed. Upon completion of the initial parameter determination, the canceller is released and the echo control responsibility is transferred to the suppressor. The canceller is then free to initialize another suppressor when new traffic enters the system. The multi-parameter adaptive echo suppressors utilize features associated with the speech coder. Any of a variety of a speech coders may be used and the individual features which result from their coding process can be analyzed by the echo canceller to generate control and training parameters for the echo suppressor.

3 Claims, 5 Drawing Figures

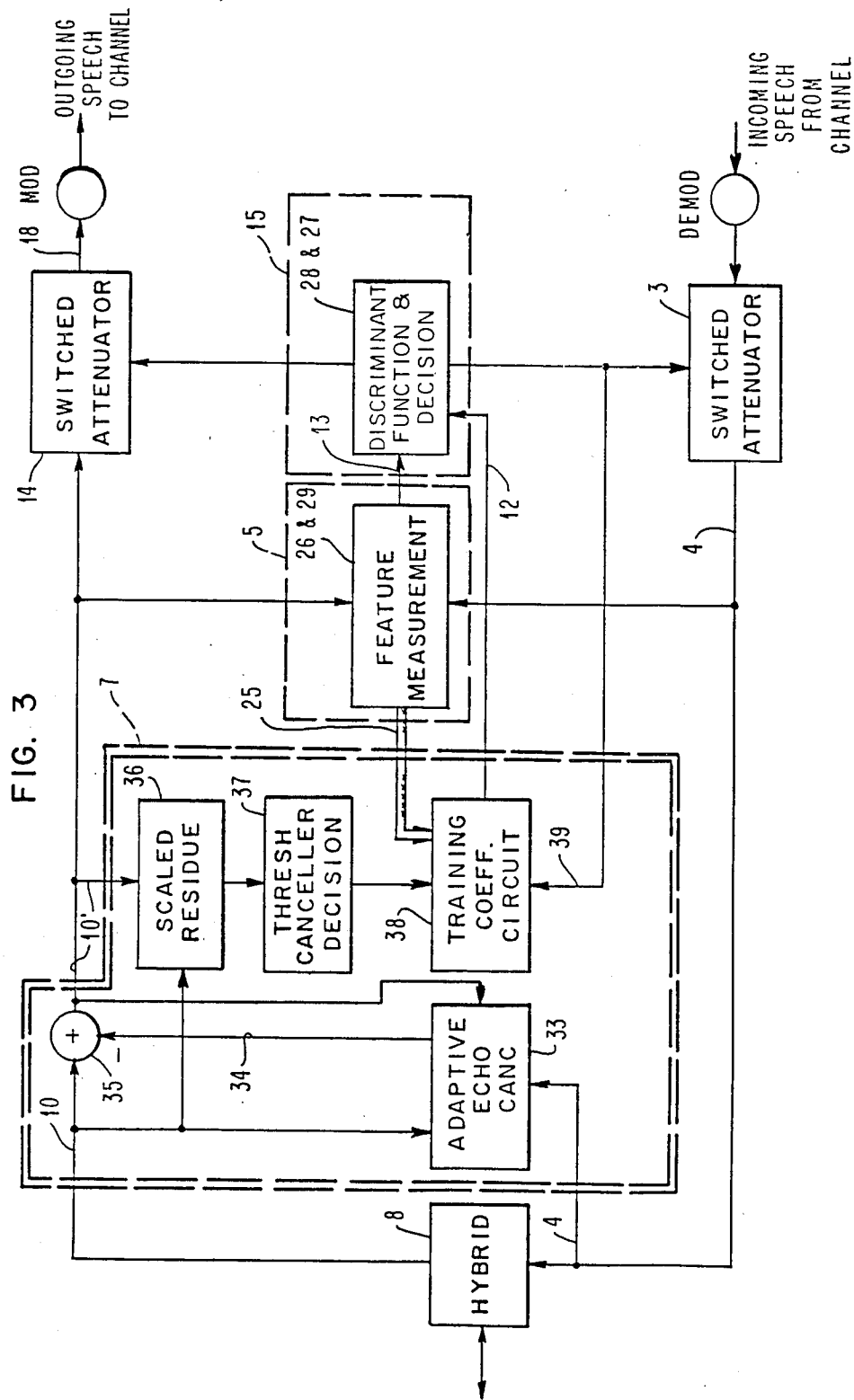

4,628,156

CANCELLER TRAINED ECHO SUPPRESSOR

FIELD OF THE INVENTION

This invention relates to voice communication or telephony systems in general and to echo suppressors or simple cancellers for use in such systems in particular.

BACKGROUND

A variety of prior art devices are currently known for echo control in voice communication systems. Two distinct types are generally classed as echo cancellers and echo suppressors. An echo canceller generally comprises two primary components, a transversal filter for modeling the impulse response of an associated echo path and an algorithmic unit which determines the filter coefficients and adapts them to achieve agreement with the echo path. Generally, such echo cancellers are operated in an adaptive mode and they monitor the state of traffic and echo conditions more or less continuously. The filters employed generally utilize many stages of delay. This requires the generation and updating of many multiplication coefficients and a large multiplication and accumulation cycle count during a real time operation. Implementing such a device requires powerful signal processing computation equipment and is generally more costly, though much more effective, than the aforementioned simple echo suppressor.

An echo suppressor is a relatively inexpensive and simple device that consists basically of a switch for interrupting the echo return path and decision logic for determining when to operate the switch. Essentially, such devices operate on a detected threshold of activity to sense that local speech traffic is being generated and then utilize this fact to interrupt or to suppress the echo path. Real time high power computational requirements are eliminated but significant clipping of voice traffic, as is well known in the art, oft times results.

OBJECTS OF THE INVENTION

In view of the foregoing known difficulties of cost, complexity and/or poor performance associated with prior art echo cancellers and suppressors in general, it is an object of the present invention to provide an improved, trainable echo suppressor operating on more sensitive parameters for control of the echo suppression path.

Yet another object of the present invention is to provide an improved echo suppression system in which a sophisticated echo canceller can be utilized in a shared arrangement over a group of echo suppressors to control their operation.

SUMMARY

The foregoing and still other unenumerated objects of the invention are met by allowing a relatively sophisticated echo canceller to provide training coefficients to a larger pool of relatively inexpensive echo suppressors. The echo suppressor utilizes a number of parameters derived by the speech coders employed in the system. A variety of speech coders and techniques exist, but all generate a series of intermediate results or output signals that may be termed "features". A feature as used in the context of this application may be any characteristic of a signal available for measurement. Selection of features useful for the classification of speech segments naturally flows from the operation of speech coders. The measured values of the features of the incoming and outgoing speech signals passing through a suppressor during each echo frame time can be utilized to form a vector or pattern forming a basis for a decision making element to open or close the suppressor switch. A suppression switching decision may be based upon the outcome of a series of operations performed on the feature measurements. Naturally, the features which are selected which may be appropriate for a particular multi-parameter echo suppressor will depend upon the nature of the associated speech coder. One example is an N band sub-band speech coder having, for example, three sub-bands. Five numbers consisting of the ratios of incoming to outgoing speech energy level in each of the three sub-bands, the total incoming energy and the total outgoing energy are easily measured parameters or "features" that result from such a speech coder's operation. The set of these numbers found in any echo control frame time may be termed a vector consisting of the five measured components. The vector can be presented to a decision making element in the echo suppressor for each echo frame time. Then the echo canceller can apply the feature coefficients or decision parameters it has derived to the individual suppressor for storage and use thereby.

BRIEF DESCRIPTION OF THE DRAWINGS

The invention will be described with reference to an illustrative preferred embodiment further described and illustrated in the drawing in which:

FIG. 3 illustrates a schematic diagram of a sharable echo canceller and training apparatus adapted to utilize feature measurements provided by an associated speech coder and to apply the coefficients generated to a decision making logic element for operation of an echo suppressor.

DETAILED SPECIFICATION

Figure 1:
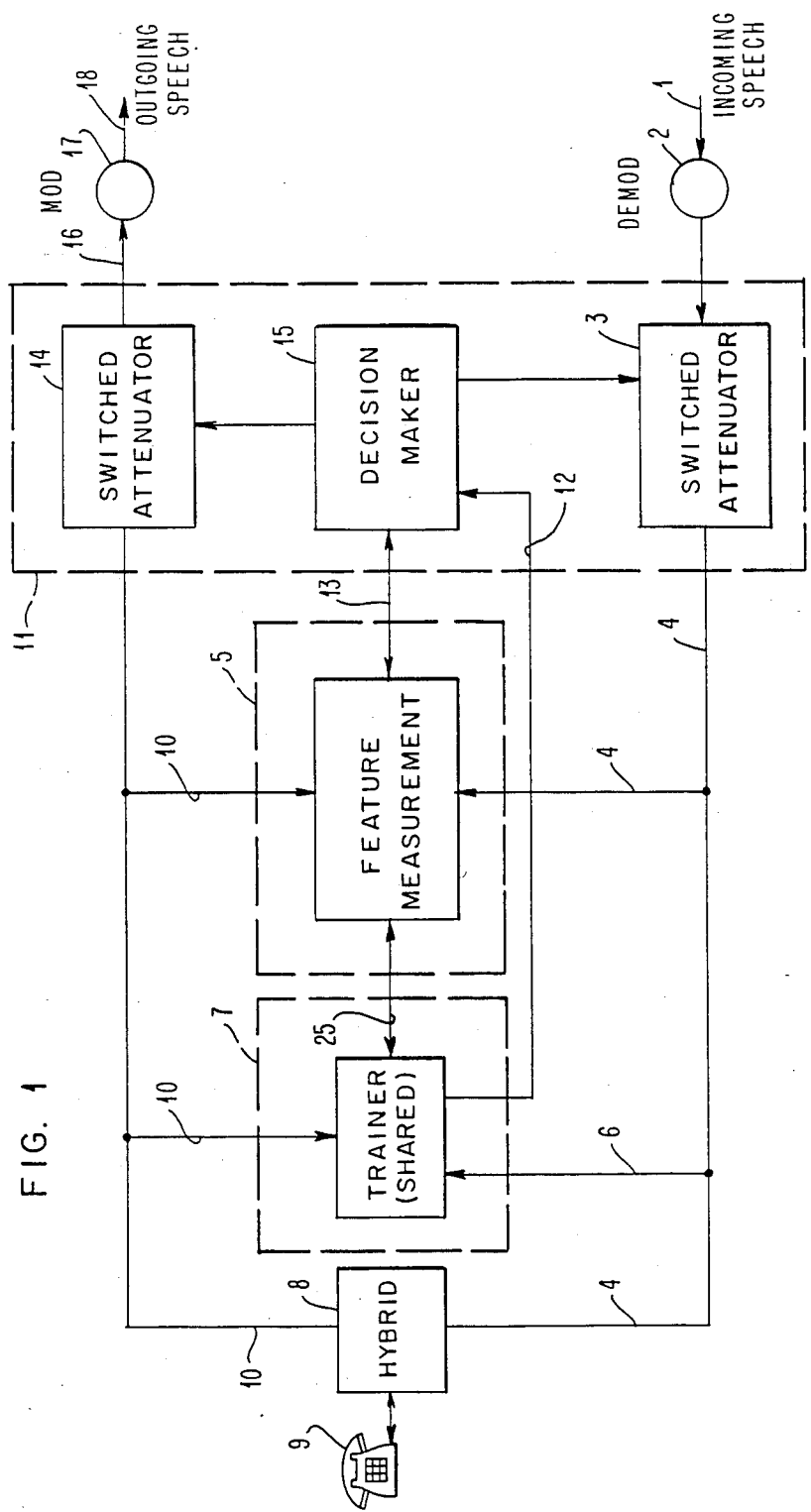
FIG. 1 is a schematic diagram of an overall flow chart for the operation showing the inter-relationship between a shared echo canceller and an individual echo suppressor in a typical telephone communication network.

Turning to FIG. 1, an overall schematic diagram of a telephony system junction is shown. Incoming speech on line 1 may be modulated in any suitable form or may be straight analog voice signals themselves. The demodulator 2 is illustrative and well known in the art for the case where the speech signals have been coded and modulated by one of the numerous well known forms for demodulating and reconverting the signals to digitized or analog voice. A normally closed attenuator switch 3 next receives the incoming demodulator signals and will either attenuate them slightly or will pass them unattenuated by the opening or closing of a switch as is well known in the art. The signals on line 4 in FIG. 1 will be assumed to be digitized samples that have been demodulated by the demodulator 2 and extracted as a stream of digital bits which have been passed through the attenuator 3 and are ready for processing to reconstruct analog voice signals. A feature measurement circuit 5 to be described in greater detail, receives these signals on line 4. A shareable trainer which may be resident in a separate unit and connected only momentarily on line 6 to the incoming signals is shown as a shareable trainer 7. The incoming signals on line 4 are also applied to the junction hybrid circuit 8 whose function is well known in the art for transmission to the telephone handset 9. The hybrid circuit 8 also receives any outgoing transmissions from the telephone handset 9 and applies these on line 10. The shareable trainer 7 monitors the output on line 10 as well as the input on line 6. It also monitors the various features extracted as a result of the coding technique employed by the feature measurement device 5 which itself also monitors the output on lines 10 and the input on line 4 as shown. Training coefficients developed by the trainer 7 are shared with the suppressor 11 over line 12. Similarly, suppressor 11 receives information on line 13 from the feature measurement circuits 5. Suppressor 11 contains the attenuator switch 3 and an outbound attenuator 14 as well as decision making logic 15 as shown. Final outbound traffic over line 16 may be applied to a modulator 17 for modulation and transmission to the outgoing channel 18. The switched attenuator 14 normally is open to block the outbound path so that no echo will be apparent at the far end receiver.

It should be clearly understood that FIG. 1 is schematic only and the exact arrangement of the components will be described in better detail with reference to a preferred embodiment. The dotted boxes for the shared trainer 7, the feature measurement function 5 and the suppressor 11 are thus shown for the purpose of illustrating the fact that these elements are generally mutable and need not reside in the specific locations illustrated in FIG. 1.

Figure 2A:
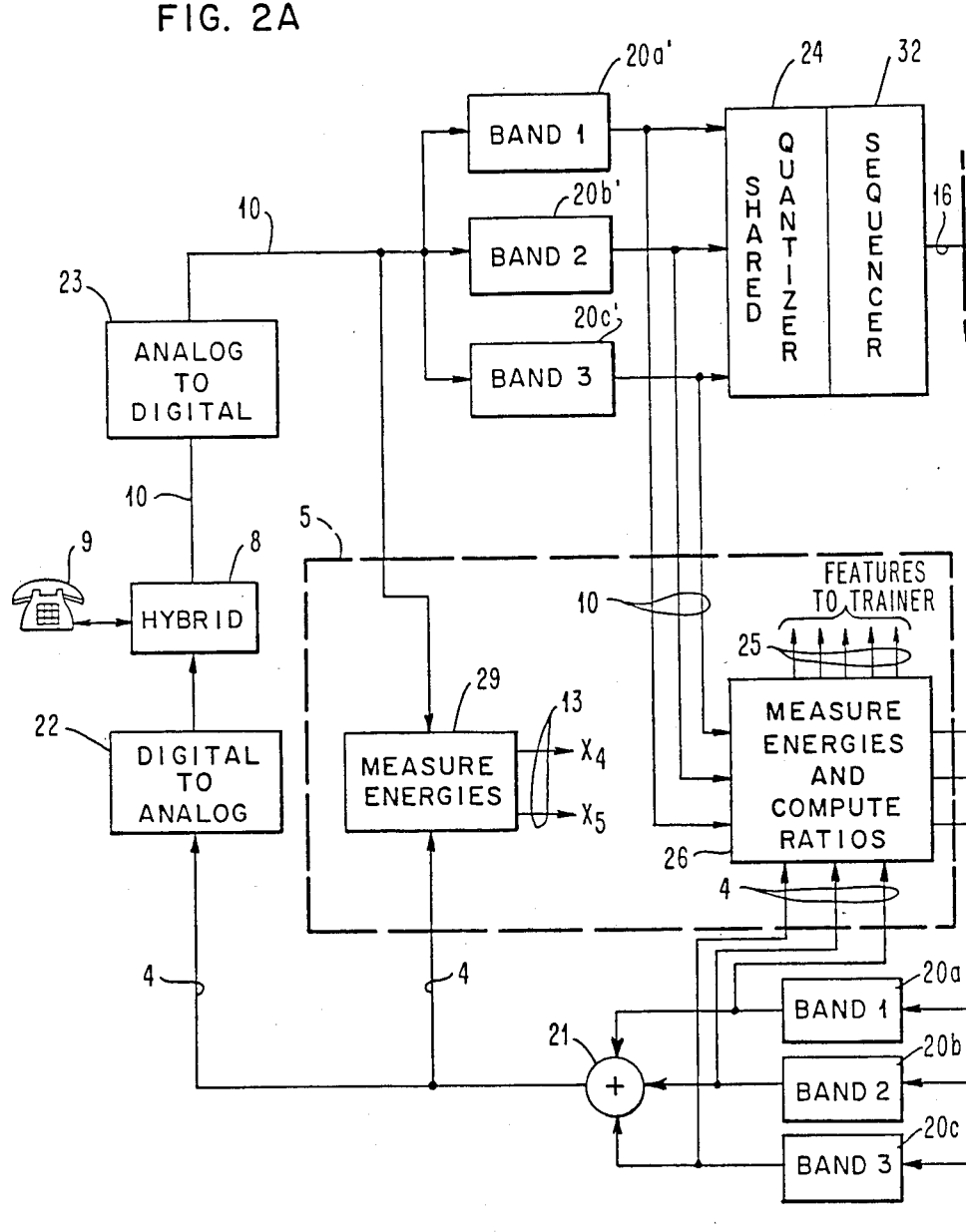
FIGS. 2A and 2B are schematic diagrams of a preferred embodiment of the present invention showing how the measurements made combine with training coefficients from an echo canceller for utilization in an echo suppressor decision making function operable for an echo suppressor as shown.

For purposes of illustration, a preferred embodiment is shown in FIG. 2 in which a three band sub-band speech coder is the type chosen for illustration. It is assumed that this is a digital system and appropriate modulators and demodulators, not shown in FIG. 2, are employed to provide digital streams to and from the outbound channel or inbound channel.

Incoming signals pass through the normally closed attenuator 3 and are applied on line 4 to an expander that increases the number of bits back to some chosen standard processing group. The outputs on lines 19 are analyzed in a series of bandpass filters 20A, 20B and 20C, constituting the three sub-bands of the present illustration. The resulting reconstructed speech signals for each band are recombined in the adder 21. The output thereof is shown as the continuation of line 4 to coincide with the description as given in FIG. 1. This signal is applied to the feature measurement circuit in dotted box 5 and also to a D to A converter 22 for application to the hybrid circuit 8. The hybrid junction circuit 8 converts the two wire telephone line to the four wires required for the handset 9 as is well known in the art. Outbound traffic originating from handset 9 is fed to the hybrid circuit 8 and from there over line 10, after passing through an A to D converter 23, it is fed to a number of other units as shown. A bank of analyzing filters 20A' through 20C' for the three band sub-band speech coder of this illustration receive the signal on line 10 and breaks it into a plurality of outputs which are fed to a quantizer 24. The quantizer 24 assigns a level to a multibit output of each of the band filters 20A' through 20C' and thereby truncates the digital representation coming from each of the bandpass filters. A sequencer 32 acts as a multiplexer to select among the various sub-bands in a rotating and prescribed sequence and provide the output on line 16. When near end speech is present, the normally opened suppressor switch 14 will be closed and the output signal supplied on line 18.

Sub-band coders and filters of the type described are well known and form no part of this specific invention herein. An article by R. E. Crochiere and S. A. Webber and J. L. Flanagan entitled, "Digital Coding of Sub-Bands" appears in the Bell System Technical Journal, Oct. 1976, pgs. 1069–1085 and shows the principles of operation for sub-band coders and filters of the type described herein.

Features are produced as the result of the sub-band coding which may be the energies present in each of the bands and the inbound and outbound energy levels. In FIG. 2, five different features are measured. The incoming and outgoing energy levels are measured in the detector box 29 and supplied on line 13 as the outputs X4 and X5. These are provided to a trainer unit 7, not shown in FIG. 2, and are also supplied to the suppressor block 15 where they are used in the discrimination operation. The energy levels present in the incoming and outgoing signals are supplied on lines 4 and 10 respectively to the energy measurement and ratio computation block 26. Outputs are supplied on line 25 to the trainer in block 7 in FIG. 3. The results of the training operations are a series of coefficients A(i) that are supplied by a training circuit or computational unit in block 7. These are supplied on line 12 to the discrimination control circuit 27 in FIG. 2 for use and storage. The output of the discrimination circuit 27 is supplied to the decision logic 28 to control opening and closing of the suppressor switches 3 and 14 respectively.

The ratios between incoming and outgoing energy in each band are designated as X1, X2 and X3 and are supplied on line 13 to the discrimination unit 27.

The five components X1, X2 through X5 can be thought of as a vector X(k) for the $k^{th}$ echo control frame. The discrimination function logic 27 operates to sum the products of each coefficient A(i) multiplied by the appropriate X measurement X(i). Then it sums all of these products from the values of $i=1$ up to $i=N$ where N is the number of features being measured. The decision to open or close the suppressor switch is based upon this total sum. If the sum D(X) is greater than 0, the decision is to open the suppressor since echo is present. If the function D(X) is less than 0, the decision is to close the suppressor since speech is being generated at the near end. In FIGS. 2 and 3, the attenuator switch 14 would be closed for voice transmission outbound but would be opened otherwise.

The various coefficients A(i) are determined adaptively and are a set of numerical weights that reflect the accuracy and reliability of each feature used in making the switching decision. The coefficients are generated by a pass and fail training process supervised in the echo canceller in block 7, FIG. 3.

Figure 2B:
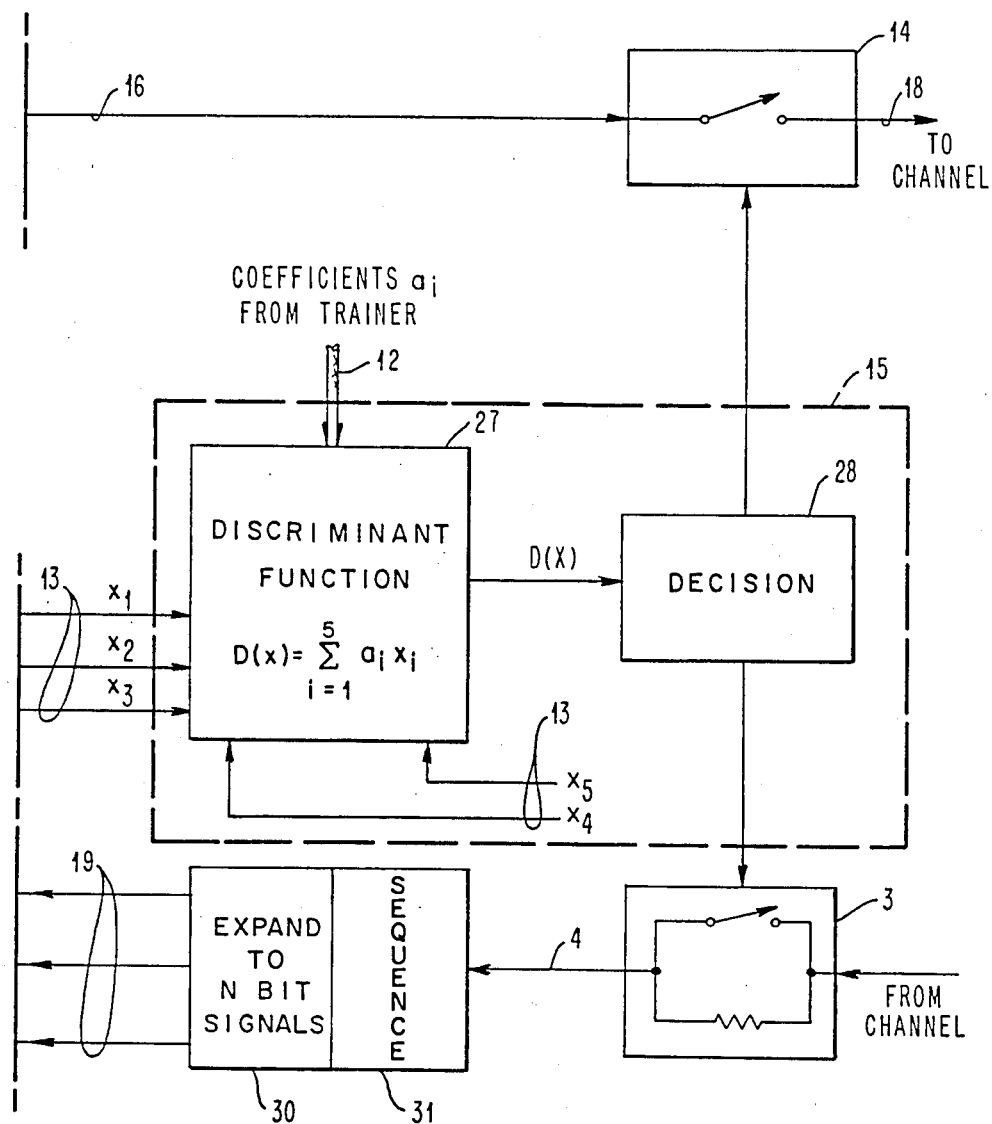

The overall discriminant multiplication and summing functions in block 27, FIG. 2B can be easily carried out by a small calculator circuit such as those widely sold for pocket calculators, otherwise themed "microprocessors". These are commonly available from a wide variety of vendors and need no further description.

The adaptive echo canceller shown in block 7 is of a type well known in the art and reference may be had to K. Ochiai, T. Araseki and T. Ogihara in an article entitled, "Echo Canceller with Two Echo Path Models" appearing in the IEEE Transactions on Communications COM-25, No. 6, June 1977, pgs. 589-595, for example. The adaptive echo canceller 33 has an impulse response which matches the expected impulse response of the echo system to which it is connected. It monitors the incoming energy on line 4 and the outgoing raw energy on line 10 and forms an estimate of what the echo signal level should be. The estimate is supplied on line 34 to a subtractor 35 and the resulting echo corrected signal is supplied on line 10'. The difference between the corrected output on line 10' and the uncorrected output on line 10 is generated by the residue circuit 36 and supplied to a threshold detector 37 which has a fixed threshold. Voice is indicated by a large residue which indicates that the outbound signal has more energy in it than would be expected, i.e., a level greater than the anticipated echo level. Echo is represented by any outputs as long as they are less than the preset threshold. The threshold is arbitrary and is set, as is known in the art, by operator intervention or automatic controls for determining clipping level and the like. The indication of "no echo" or "echo" is supplied to a training coefficient circuit or algorithmic unit 38. Unit 38 is also supplied with all of the feature measurements on lines 25 from FIG. 2 coming from the feature measurement and ratio circuits 26 and 29, respectively. The present state of the decision logic is also supplied on line 39 to the algorithm unit 38. The algorithm unit 38 may be a fixed circuit or a programmed microprocessor, for example, operating with the well known training algorithm recited below. During the training portion, echo control for the system is carried out by the canceller in block 7, specifically the adaptive echo canceller 33. The trainer 38 in FIG. 3 is presented with a series of training vectors which are spontaneously generated as the voice link operates and the coder input and output energies are measured as previously described. One set of training vectors are provided each frame time for the measured values for the selected features. The echo canceller's residue is measured in block 36 and supplied to the threshold unit 37 as just described. Various weights for the suppressor coefficients are chosen based upon the presence of echo or no echo. The canceller decision for echo or no echo is supplied from block 37 depending upon whether the fixed threshold is exceeded. The suppressor coefficient weights $A(i)$ are trained on the set of vectors by a self-adaptive algorithm operating as discussed below. When the suppressor 15, FIG. 2B, has been successfully trained, the switching decision will be in agreement with the residue and threshold decisions obtained from the canceller 33. Then the trainer circuit in block 7, FIG. 3, can be freed for usage with another suppressor circuit on another communication link.

The following well known algorithm is described by N. J. Nilsson in "Learning Machines" McGraw-Hill, N.Y., 1965, pgs. 79-81. Let $A(k)$ be a vector of weights in the $k^{th}$ echo frame. Then, $A(k)=(A1, A2, A3 \ldots AN)$. The correction applied is generated as follows. $A(k+1)=A(k)$ if $D(X)$ is greater than 0 and the input is presently echo state or if $D(X)$ is less than 0 and the input is presently in the state of no echo. However, $A(k+1)=A(k)-c(k)\times X(k)$ if $D(X)$ is greater than 0 and the input is not in the echo state. And, $A(k+1)=A(k)+c(k)\times X(k)$ when $D(X)$ is less than 0 and the input is in the echo state. In the foregoing, it is assumed that $c(k)$ is a constant greater than 0. The value of the constant is chosen in the following manner.

In the preferred embodiment, a "fixed-increment error correction procedure" is employed as given by Nilsson [IBID]. For this case, the value of $C(k)$ is a constant, not dependent on k, chosen based on the desired rate of convergence. In the preferred embodiment, $C(k)=0.10$ is chosen. Other algorithms for the determination of $C(k)$ are well-known, as, for example, the "Absolute Error-Correction Procedure" also described by Nilsson.

Additionally, the starting constants for the coefficients $A(i)$ are at an assumed initial value, for example, all 1's for starting.

Figure 4:
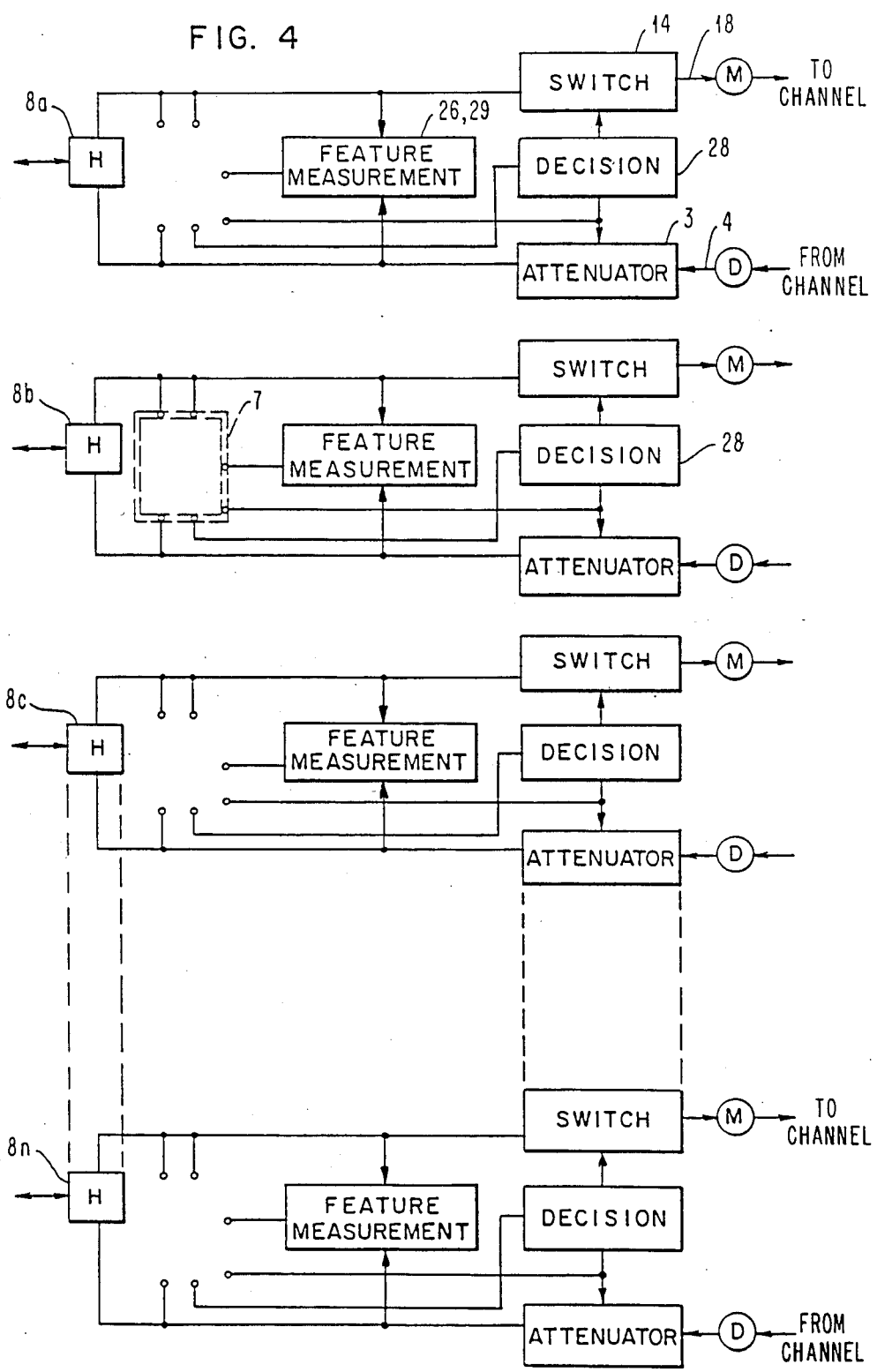
FIG. 4 illustrates a typical plurality of echo suppressors and channels for a multi-channel voice circuit and shows how a single shared canceller and trainer such as that shown in FIG. 3 can be utilized to set up operation for a number of different suppressors.

Turning to FIG. 4, the shared canceller and trainer 7 for FIG. 3 is shown in dotted outline in association with hybrid circuit 8B. A number of other overall communication link circuits are indicated by the different hybrid circuits 8A through 8E and are configured in the same form as shown in FIG. 3. The shared canceller and trainer 7 can be applied to the terminals as shown in each of these hybrid circuit and communication system connections in similar fashion to the one depicted in association with hybrid circuit 8B as will be apparent to those of skill in the art.

In operation, each decision logic circuit 28 is supplied with an initial set of coefficients from the canceller and trainer block 7 and then operates on its own utilizing the discriminatory function as depicted in block 27 in FIG. 2 until the next updating and reinitiation of transmission. During this time, the canceller and trainer circuit 7 can be utilized to start up operation on any of the other links. Other modes of operation are clearly possible. For example, a small pool of relatively expensive adaptive cancellers such as shown in block 7 could be statistically shared with a large pool of relatively inexpensive suppressors. As long as the system is lightly loaded, the echo control could be solely provided by this small pool of cancellers. As the loading would increase, the cancellers could relinquish their role as primary echo control devices and assume the role of trainers for the bank of suppressors. The suppressors will then assume the primary responsibility for echo control.

The advantages that flow from this type of operation and that discussed above are many. First, the training of the coefficients a(i) adapt the suppressor to each echo path in a nearly ideal manner. Secondly, the initial selection of "features" specifically tailors the suppressor to match and exploit the properties of its companion speech coder, regardless of the sort of speech coder actually employed. Thirdly, the discriminate function utilized in the suppressor involves an element of voting since the discriminatory function $D(X)$ is based upon the sum of multiplied coefficients and feature measurements and is less vulnerable to errors or inputs swayed by a single feature. Fourth, the features themselves may be simple and easily measured parameters of the incoming and outgoing signals or a byproduct of the speech coding operation itself. In the example depicted, the features selected are actual byproducts of the speech coder of the sub-band type described.

It will be apparent to those of skill in the art that the features such as those depicted with reference to the preferred embodiment were chosen to match the characteristics of the hypothetical sub-band speech coder.

No specific set of features would be chosen without first examining the nature of the specific speech coder used with the echo suppressor. A time domain coder, for example, would profit better from the selection of a different set of features than a coder operating in the frequency domain. These factors are well known in the art of speech coding and need no further description.

Having thus described my invention with respect to a preferred embodiment thereof and having illustrated the various principles of operation and concepts involved in carrying out the invention, it is my intention that the claims which are appended hereto be taken not by way of limitation but of example.

I claim:

1. An improved echo control means for a multiple voice link speech coder communication system having a plurality of voice links, a speech coder means, an echo suppressor circuit in each said link in said system, and at least one adaptive echo canceller means, said control means comprising:

a trainer circuit comprising an adaptive echo canceller and means for generating respective suppressor control coefficients for each said voice link;

residue means for generating a measure of the residue of said trainer's echo canceller operation by subtracting an output of the trainer's echo canceller from a voice link signal input;

means for monitoring the operation of said speech coder separately for each said voice link to obtain signal feature measurements thereof and for monitoring said residue means, said monitor means providing said trainer circuit with a measurement of the residue of the trainer's echo canceller cancelling operation for each said link for use by said trainer in providing said respective control coefficients in accordance with said signal feature measurements and said measure of the residue for each said voice link for use in adjusting each voice link's said suppressor circuit;

means for connecting said trainer circuit to the echo suppressor circuit for each said voice link to supply said respective suppressor control coefficients to the echo suppressor circuit for each said link; and said echo suppressor circuit for each said voice link utilizing said respective control coefficients for controlling the operation of suppression for each respective voice link.

2. An improved echo control means for a multiple voice link speech coder communication system comprising:

a plurality of voice links;

a speech coder;

at least one trainer means comprising an adaptive echo canceller connectable individually to each said voice link;

a suppressor circuit connected to each said voice link;

a monitor means connected to each said voice link for obtaining signal feature measurements thereof and individually supplying said feature measurements to said trainer means and to the respective suppressor circuit connected to each respective voice link;

said trainer means utilizing said feature measurements from each said voice link and, responsive thereto, generating control coefficients for each suppressor circuit connected to each said voice link; and means for supplying said control coefficients to each said suppressor circuit connected to each said voice link.

3. In an improved echo control means as described in claim 1 or claim 2, said control means further comprising:

means for utilizing said control coefficients in conjunction with a plurality of said signal feature measurements for each said voice link for controlling echo suppression in each said voice link based upon the summation of the result of the multiplication of feature measurements by coefficients derived by said trainer means.

* * * * *